Figure 1:
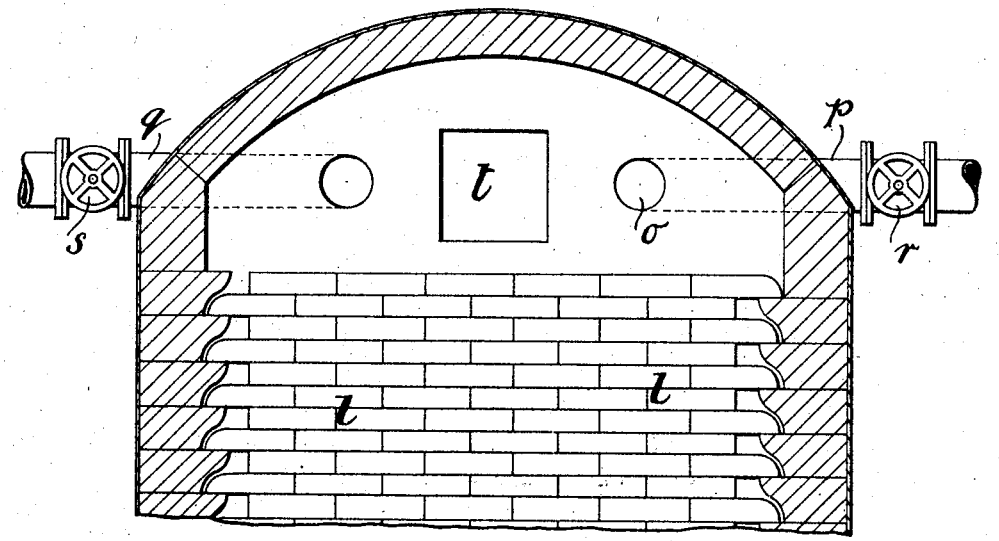
Figure 1:
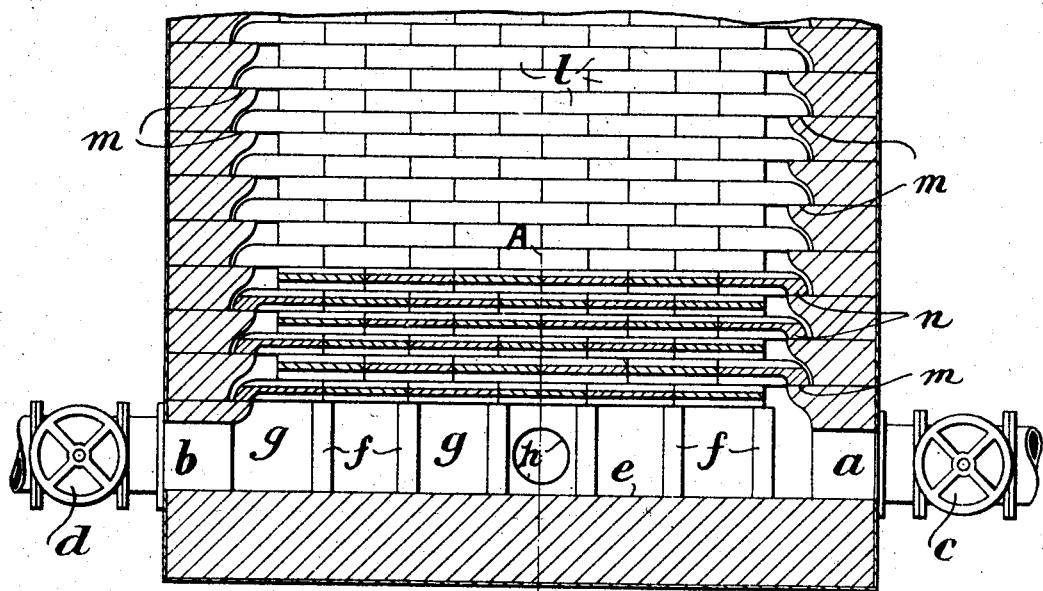

No. 778,182. PATENTED DEC. 20, 1904.
H. S. ELWORTHY.
HYDROGEN GENERATOR.
APPLICATION FILED MAR. 21, 1904.

NO MODEL. 2 SHEETS—SHEET 1.

WITNESSES: INVENTOR:
Herbert Samuel Elworthy
By his Attorneys

No. 778,182. PATENTED DEC. 20, 1904.
H. S. ELWORTHY.
HYDROGEN GENERATOR.
APPLICATION FILED MAR. 21, 1904.
NO MODEL. 2 SHEETS—SHEET 2.

WITNESSES: INVENTOR:
Herbert Samuel Elworthy,
By his Attorneys

UNITED STATES PATENT OFFICE.

HERBERT SAMUEL ELWORTHY, OF LONDON, ENGLAND, ASSIGNOR OF ONE-HALF TO ERNEST HENRY WILLIAMSON, OF LONDON, ENGLAND.

HYDROGEN-GENERATOR.

SPECIFICATION forming part of Letters Patent No 778,182, dated December 20, 1904.

Original application filed January 21, 1903, Serial No. 139,941. Divided and this application filed March 21, 1904. Serial No. 199,130.

*To all whom it may concern:*

Be it known that I, HERBERT SAMUEL ELWORTHY, consulting chemical engineer, a subject of the King of Great Britain and Ireland, residing in Dashwood House, New Broad street, London, England, have invented certain new and useful Improvements in Hydrogen-Generators, of which the following is a specification.

This invention relates to apparatus for the production of hydrogen for use in the manufacture of gas for illuminating, heating, and power purposes, as described in the specification of United States Letters Patent granted to me, No. 738,303, dated September 8, 1903. In the manufacture of gas according to the said specification it is proposed to mix hydrogen with water-gas and lead the mixture over metallic nickel, whereby a gas is obtained consisting chiefly of methane. The present application is a division of my application, Serial No. 139,941, of January 21, 1903, wherein I have described and claimed in general a form of apparatus for practicing such process.

The apparatus which forms the subject of the present invention is designed to produce hydrogen for this purpose according to the known reaction of steam upon metallic iron, whereby at a suitable temperature the steam is decomposed, the hydrogen liberated, and the iron converted to the state of magnetic oxid in accordance with the equation

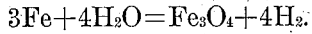

$$3Fe + 4H_2O = Fe_3O_4 + 4H_2.$$

This reaction has frequently been utilized in the gas industry, the iron being alternately oxidized by the steam in a hydrogen-producing stage and the resulting oxid reduced by a gaseous reducing agent—water-gas, for example. The apparatus hitherto proposed for the purpose, however, are subject to serious drawbacks in practice, owing to the liability of the iron to cake together and to its difficulty of access and removal. The iron rapidly cakes and chokes, so that the steam or gas comes into contact with only a small proportion of the active surface and great loss of efficiency results. It is thus frequently necessary to remove and replenish the iron; but this is a laborious and expensive operation, owing to the construction of the furnace and difficulty of the removal of the iron. Considerable quantities of heat are liberated in the reducing stage of the process, and although, of course, a certain quantity of this heat will be absorbed by the walls and other parts of the furnace no practical means are provided to store and economize this heat in the known forms of furnace. Now by the present invention I not only overcome these disadvantages, but I also provide a very large body or mass of inert material in the furnace, this material acting, so to speak, like a heat sponge to store up the heat liberated in the reducing stage, while always preserving a clear path for the steam or reducing-gas, insuring their perfect and intimate contact with the iron and permitting of ready removal and changing of any and every portion of the charge of active material. I thus effect a great economy in fuel, while largely increasing the efficiency of the furnace and simplifying and improving the working thereof.

According to the present invention the iron in finely-divided form is carried in a large number of separate trays of refractory firebrick or the like, each adapted to contain a shallow layer of iron in finely-divided form and to be built up in successive layers from bottom to top of the furnace, so as to form a close-lying refractory filling. The trays are open at their ends to enable the steam or gas to pass freely over them in contact with the iron when built up, and they have, preferably, supporting flanges or feet for supporting the under face of one tray at a suitable distance from the material on the tray below, and this under face of the tray reflects or radiates a great quantity of heat onto the shallow layer of metallic iron during the heat absorbing or oxidizing stage, while at the same time superheating the steam as it passes along the narrow shallow channel between the upper and lower series of trays. It will be evident that these flanges or feet may be dispensed with if the holding space of the trays be made sufficiently deep. When the trays are built up in the furnace, they form a number of distinct narrow flues or channels containing a shallow layer of iron and running in a zigzag course from bottom to top of the furnace and affording free passage for the steam or reducing-gas. These narrow flues, so to speak, divide up the mass of refractory material into a cellular structure such that while the gases can pass freely through the cell-flues over the iron the largest possible amount of heat is absorbed by the refractory material.

The furnace is preferably heated internally, and to this end it may be also so constructed with the combustion-chamber in the base that it can in the first place be heated to the required extent by gas-firing either with producer, water, or coal gas. It may, however, be constructed without this combustion-chamber in the base and heated by means of hot air or heated products of combustion from another source, preferably by a hot-air blast from an ordinary regenerative stove, and this stove may be the one in which the steam which has to be passed over the iron for the production of hydrogen is superheated at a later stage, as hereinafter described.

In order to facilitate the production of the hydrogen by contact of steam with iron, in addition to heating the retorts or furnaces containing the iron, the steam used for the reaction may be very highly superheated in regenerative blast-stoves. The iron should be in a finely-divided state, but may be in porous lumps, if desired. In order to reduce the oxid of iron to the metallic state, and thus render it available for reuse, I may pass a certain quantity of the producer-gas made during the blowing stage of the water-gas process or in other convenient way over it at a high temperature, whereby the carbon monoxid contained in that gas, assisted by the small proportion of hydrogen generally present, reduces it in accordance with the equation $$Fe_3O_4 + 4CO = 3Fe + 4CO_2,$$

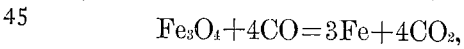

the hydrogen being at the same time converted into water. When using producer-gas for the reduction of the iron, it is advisable to superheat the producer-gas, as in this manner greater heat is produced and stored up in the iron-containing furnace for use in the hydrogen-making part of the process.

Instead of using the producer-gas obtained in the blowing-up stage of the water-gas process for reducing the oxid of iron I may use a portion of the water-gas itself or the gas from a separate gas-producer, preferably worked by means of a steam-jet blower, as a certain proportion of hydrogen assists in the reduction of the iron oxid by the carbon monoxid.

The accompanying drawings represent an example of hydrogen-producer constructed according to the invention.

Figure 2:
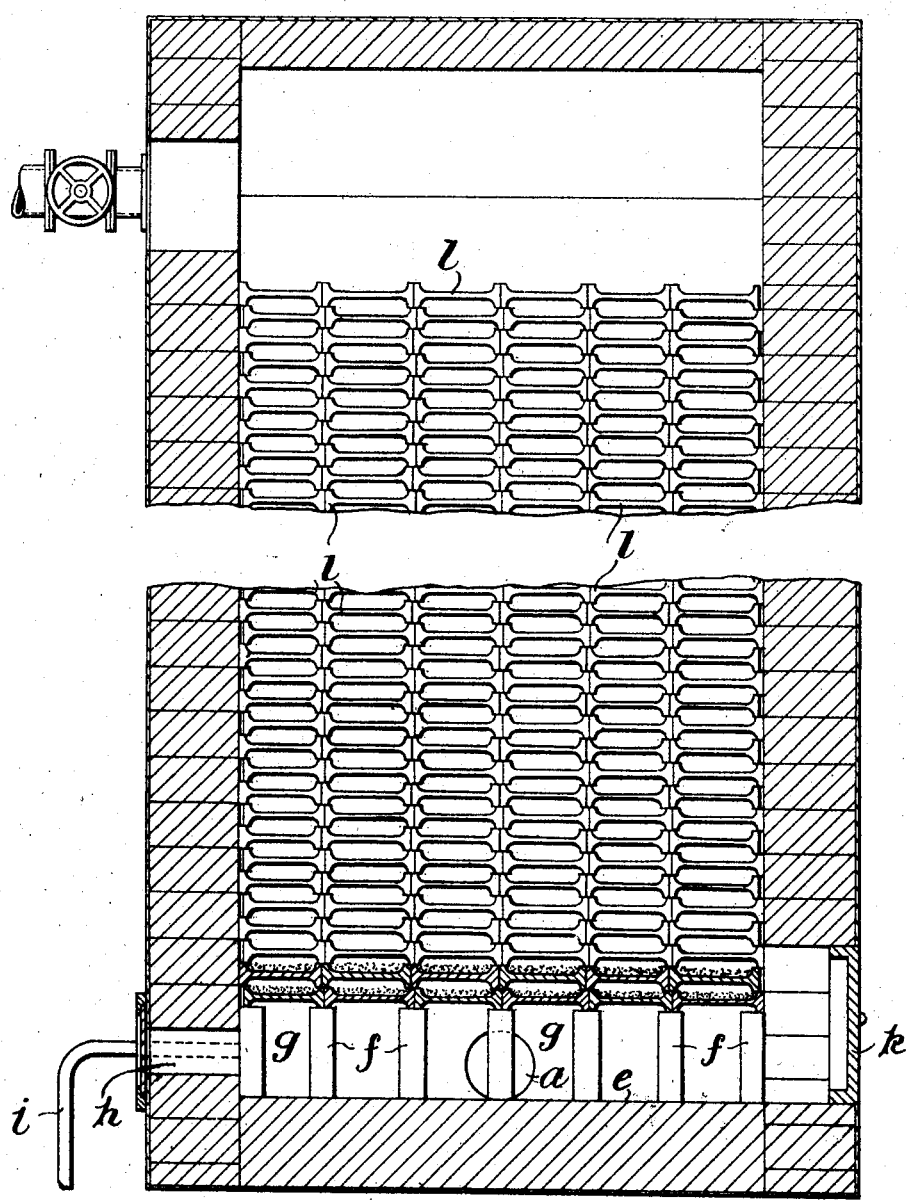

Figure 1 is a sectional side elevation, a view of the end trays being shown in section; Fig. 2, a sectional front elevation, partly in transverse vertical section, on line A B of Fig. 1.

This producer consists of a rectangular structure of refractory brick with an outer metallic shell or casing and having an arched top, as shown. It is formed or provided at the base with an inlet $a$ for gaseous fuel for heating up the generator when required and also with another inlet $b$ for producer or water gas for reducing the oxid of iron formed in the hydrogen-producing reaction, both these inlets being provided with suitable valves $c$ and $d$ to enable them to be closed. It will be obvious that one such inlet would suffice; but it is in many cases convenient to have separate inlets for the heating and reducing operations. On the floor $e$ of the generator are disposed a convenient number of pillars or supports $f$, arranged at equal distances apart along and across the base of the generator, so as to support the ends of the trays for containing iron when these are superposed thereon, as described later. A combustion-chamber $g$ is thus provided at the base of the generator. A valved air-inlet $h$ opens through the side of the generator into the combustion-chamber $g$, and a steam-inlet pipe $i$ is also arranged to discharge into same.

$k$ is a manhole for cleaning purposes provided with a door.

$l$ represents the trays for containing the iron. These are of refractory fire-brick. They are of square shape in plan and of I form in section, as seen in Fig. 2—that is to say, they are formed with a flange or lip at two opposite sides extending for a short distance above and below the central horizontal plane of the tray, so as to support the flanges of the tray next above and provide a channel between each pair of superposed trays for the passage of the steam or gases. These trays are filled with iron in powdered form and are piled one above another along and across the generator, the abutting corners or angles of the bottom range of trays being supported by the pillars $f$, disposed, as before described, at equal distances along and across the floor of the producer. The remaining trays are built up over the bottom range of trays, each range being supported by the flanges of the trays of the row next below. The refractory fire-brick lining at the right and left hand side of the generator is formed with a vertical series of supporting-ledges $m$, extending from front to back, each of these ledges being designed to support the end trays of the range next above at the side where the particular ledge is situated. Each range of trays is disposed in baffled or staggered order with respect to the range next above it, the left-hand trays of the bottom row, for example, being supported on the bottom left-hand ledge $m$ and lying close against the wall of the generator, while the right-hand trays of the bottom range do not extend quite to the wall on the right-hand side. (See Fig. 1.) The right-hand end trays of the second range are then supported on the bottom right-hand support m and, similarly, lie close against the wall at that side, while the left-hand trays of this second range do not extend quite to the opposite wall, and so on to the top, this arrangement being adopted to allow for expansion of the trays when heated. The end trays of each range which are supported by the ledges m are somewhat different in shape from the other trays. Their form will be seen on reference to Fig. 1, which shows some of these end trays in section. It will be seen that the flanges or lips of these trays are curved to conform to the curve of the supporting-ledges, and at the side adjacent thereto they are formed with a lip n, extending from front to back of the tray, so that when each range of trays is placed in position the heating or reducing gases or steam, as the case may be, passed through the generator is or are baffled by every succeeding range of trays at each side of the generator alternately, so that the steam or gases pass from the top of each range of trays to the top of the range next above, so as to pass over the material on same, as shown by the arrows. Further, the abutting lips or flanges of the trays which are built up as before described constitute vertical walls or partitions which divide the interior of the generator up into a number of independent flues or passages running in a zigzag course from back to front and from front to back alternately from bottom to top of the generator. In this way intimate contact of the steam or gases with the material on each tray is assured, and, moreover, the large quantities of heat evolved in the reaction of the producer-gas with the iron to reduce the oxid of iron is stored up and rendered available for use in the oxidation stage of the working, great economy being thus attained. Each range or course of trays is also preferably disposed in slightly-staggered order with respect to the range next above, as shown in Fig. 2, a slight space being left between the end trays of each range at the front and back alternately. In this way the trays can expand evenly without interfering with the uninterrupted course of the gases, as above described.

o is the hydrogen-outlet to the supply-pipe p, which leads the hydrogen to the point where it is required to mix it with the water-gas in the process of gas manufacture before referred to.

q is an outlet-pipe for the waste gases obtained in the reducing stage of the working—that is to say, when the producer or other reducing gas is passed through the generator to reduce the iron oxid formed in the hydrogen-producing stage. Valves r and s are provided in outlet-pipes p and q, respectively, to enable same to be opened and closed when required, and the valve r enables the amount of hydrogen delivered from the generator to be controlled.

t is a manhole adapted to be closed by a suitable door and giving access to the interior of the generator to enable the trays to be placed in position therein.

It will be understood that when the generator is first run to produce hydrogen the trays contain a suitable depth of metallic iron in finely-divided form and are piled up in position, as above explained. A convenient way of obtaining the finely-divided metallic iron is to fill the trays with oxid of iron and pile them in position in the furnace and then reduce the oxid to the metallic state by passing producer or water gas over it after it has been heated to the required temperature. When the iron is in the metallic state, valves c and s and air-inlet h are opened and the man-holes and valves d and r are closed. Water-gas or other gaseous fuel at a high temperature is admitted by the inlet a. The gaseous fuel on meeting the air in the base of the generator is ignited, and the hot products of combustion rise through the trays, thus heating them to a high temperature, the heat being absorbed and stored by the fire-brick trays and filling. When the interior of the generator has thus been heated to a sufficient temperature, the gas-inlet a, air-inlet h, and valve s are closed and valve r is opened. Steam, preferably superheated, is turned on by the pipe i and circulates around the trays, oxidizing the iron thereon, the resulting hydrogen passing away by the pipe p. In order to revivify the iron, valve r, inlet a, and air-inlet h are closed and valve s is opened. Producer or water gas is then admitted by inlet b and in its passage around the trays reduces the iron oxid thereon, the waste gases passing away to a chimney or uptake by the valve s. If necessary, the generator may be heated up in the manner above described before passing the producer or water gas therethrough to revivify the iron.

What I claim, and desire to secure by Letters Patent, is—

1. A hydrogen-producing furnace including in combination a casing, supply-pipes for steam and reducing-gas, and a large number of separate refractory trays adapted to contain a shallow layer of iron in finely-divided form, said trays being built up removably in the furnace in successive courses as a refractory filling, and when in position dividing up the capacity of the furnace into a number of distinct shallow flues or channels running in a zigzag course from bottom to top of the furnace, whereby free passage is provided through said flues or passages for the steam or reducing-gas over the iron on the trays, the heat evolved in the reducing stage being largely saved and stored, while the trays can be readily removed and replaced as described.

2. A hydrogen-producing furnace including in combination a filling composed of refractory trays $l$ having a flange at each of its opposite sides extending above and below the horizontal portion, said trays being built up in successive courses in the furnace, and means for inclosing said filling, substantially as and for the purpose specified.

3. In apparatus for the manufacture of gas suitable for heating and power purposes, a hydrogen-generator comprising in combination a closed structure of refractory material inclosed in a metallic casing and having an admission-opening for gaseous fuel to said generator, an air-admission orifice, a steam-inlet, an admission-opening for a gaseous reducing medium to said generator, a hydrogen-outlet and an outlet for the products of combustion of said gaseous fuel and for said reducing medium, a series of refractory heat-retaining trays for containing iron in finely-divided form, disposed in said generator in alternate courses, said courses being in such relative positions that the products of combustion of the gaseous fuel or the reducing medium or steam when admitted to said generator are caused to pass over the said courses in succession from side to side throughout the generator, and valves for opening and closing said admission orifices and inlets and outlets according to requirement, substantially as described.

In witness whereof I have hereunto signed my name in the presence of two subscribing witnesses.

HERBERT SAMUEL ELWORTHY.

Witnesses:
THOMAS L. WHITEHEAD,
GEORGE CLARE.